United States Patent
Grassi et al.

(10) Patent No.: US 7,927,059 B2
(45) Date of Patent: Apr. 19, 2011

(54) PIPELINE PADDING MACHINE WITH A DEBRIS-RESISTANT ESCALATOR ASSEMBLY

(75) Inventors: Giordano Grassi, San Pancrazio (IT); Ricky L. Layh, Boulder, CO (US)

(73) Assignee: Worldwide Machinery Pipeline Division, Channelview, TX (US)

( * ) Notice: Subject to any disclaimer, the term of this patent is extended or adjusted under 35 U.S.C. 154(b) by 457 days.

(21) Appl. No.: 11/548,316

(22) Filed: Oct. 11, 2006

(65) Prior Publication Data

US 2008/0107510 A1    May 8, 2008

(51) Int. Cl.
  *B65G 67/28*    (2006.01)
(52) U.S. Cl. ........ 414/334; 414/339; 198/708; 198/716; 198/730; 198/732
(58) Field of Classification Search ................. 198/708, 198/716, 822–823, 853, 730, 732; 414/339, 414/334; 180/9.1, 9.21
See application file for complete search history.

(56) References Cited

U.S. PATENT DOCUMENTS

| | | |
|---|---|---|
| 1,672,212 A | 6/1928 | Hale |
| 1,804,423 A * | 5/1931 | Krenzke ........................ 198/834 |
| 1,917,652 A * | 7/1933 | Krieger .......................... 110/272 |
| 2,669,338 A | 2/1954 | Kling |
| 2,696,287 A | 12/1954 | Lowell |
| 3,091,999 A | 6/1963 | MacDonald |
| 3,330,578 A | 7/1967 | Kress |
| 3,416,419 A | 12/1968 | Kronholm |
| 3,446,026 A | 5/1969 | Fikse |
| 3,451,571 A | 6/1969 | Brisson |
| 3,471,953 A | 10/1969 | Wyatt |
| 3,479,755 A | 11/1969 | Schropp |
| 3,701,422 A | 10/1972 | Downey |
| 3,901,617 A | 8/1975 | Herbst |
| 3,908,292 A | 9/1975 | Harris |
| 3,972,406 A | 8/1976 | MacDonald |
| 3,981,089 A | 9/1976 | Burrows |
| 4,011,936 A | 3/1977 | Hall |
| 4,057,917 A | 11/1977 | Burrows |
| 4,123,857 A | 11/1978 | Enters et al. |
| 4,147,226 A | 4/1979 | Kleespies et al. |

(Continued)

FOREIGN PATENT DOCUMENTS

JP    04103476 A    4/1992

OTHER PUBLICATIONS

Superior Manufacturing SPD-250 Padding Maching product brochure, undated.

(Continued)

*Primary Examiner* — Saúl J Rodríguez
*Assistant Examiner* — Jonathan D Snelting
(74) *Attorney, Agent, or Firm* — Smith IP Services, P.C.

(57) ABSTRACT

A pipeline padding machine includes a debris-resistant escalator flight. A pipeline padding machine includes an escalator assembly with multiple flight sections attached to a track. A gap between leading and trailing edges of respective adjacent flight sections may be substantially the same when the track is substantially straight, and when the track is at its maximum curvature. Leading and trailing edge portions of each flight section may be angled relative to a longitudinal axis of a corresponding track section by a same angle as that between adjacent track sections when the track is at its maximum curvature. The edge portions of respective adjacent flight sections may be substantially parallel to each other when the track is at its maximum curvature.

20 Claims, 4 Drawing Sheets

U.S. PATENT DOCUMENTS

| | | | |
|---|---|---|---|
| 4,212,250 A | 7/1980 | Burgess | |
| 4,221,505 A | 9/1980 | Taylor-Smith | |
| 4,290,820 A | 9/1981 | Swisher, Jr. et al. | |
| 4,333,561 A | 6/1982 | Schlegel | |
| 4,372,617 A | 2/1983 | Zamboni | |
| 4,377,365 A | 3/1983 | Layh | |
| 4,505,356 A | 3/1985 | Baier | |
| 4,616,957 A | 10/1986 | Burrows | |
| 4,633,602 A | 1/1987 | Layh | |
| 4,648,776 A | 3/1987 | Hradil et al. | |
| 4,664,791 A | 5/1987 | McClain | |
| 4,697,696 A * | 10/1987 | Howe et al. | 198/822 |
| 4,805,703 A | 2/1989 | Carlsson | |
| 4,840,269 A * | 6/1989 | Anderson | 198/822 |
| 4,861,461 A | 8/1989 | Utterback | |
| 4,912,862 A | 4/1990 | Bishop | |
| 4,921,066 A | 5/1990 | Conley | |
| 4,948,299 A | 8/1990 | Cronk | |
| 4,955,756 A | 9/1990 | Klamar | |
| 5,084,991 A | 2/1992 | Cronk | |
| 5,097,610 A | 3/1992 | Bishop | |
| 5,120,433 A | 6/1992 | Osadchuk | |
| 5,137,144 A | 8/1992 | Uehara | |
| 5,183,160 A | 2/1993 | McClain | |
| 5,195,260 A | 3/1993 | Osadchuk | |
| RE34,289 E | 6/1993 | McClain | |
| 5,259,699 A | 11/1993 | Klamar | |
| 5,261,171 A | 11/1993 | Bishop | |
| 5,271,168 A | 12/1993 | Wilson | |
| 5,344,254 A | 9/1994 | Sartain | |
| 5,363,574 A | 11/1994 | Osadchuk | |
| 5,421,108 A | 6/1995 | Stewart | |
| 5,430,962 A | 7/1995 | Osadchuk | |
| 5,479,726 A | 1/1996 | Bishop | |
| 5,493,796 A | 2/1996 | Ballew | |
| 5,540,003 A | 7/1996 | Osadchuk | |
| 5,551,356 A * | 9/1996 | Post | 110/269 |
| 5,694,709 A | 12/1997 | Cronk | |
| 5,741,087 A | 4/1998 | Osadchuk | |
| 5,743,030 A | 4/1998 | Sirr | |
| 5,765,967 A | 6/1998 | Klaymar | |
| 5,771,612 A | 6/1998 | Lynch | |
| 5,788,168 A | 8/1998 | Gilbert | |
| 5,823,707 A | 10/1998 | Lodovico | |
| 5,833,047 A | 11/1998 | Howe | |
| 5,846,026 A | 12/1998 | Gilbert | |
| 5,864,971 A | 2/1999 | Jones | |
| 5,938,373 A | 8/1999 | Scudder | |
| 6,029,378 A | 2/2000 | Cronk | |
| 6,055,749 A | 5/2000 | Cronk | |
| 6,108,945 A | 8/2000 | Cronk | |
| 6,125,558 A | 10/2000 | Stewart | |
| 6,138,837 A | 10/2000 | Cruz | |
| 6,158,925 A | 12/2000 | Schleining et al. | |
| 6,237,257 B1 | 5/2001 | Cronk | |
| 6,318,930 B1 | 11/2001 | Scudder | |
| 6,477,794 B1 | 11/2002 | Hoffmann | |
| 6,502,333 B1 | 1/2003 | Striegel | |
| 6,695,127 B1 | 2/2004 | Dobranski | |
| 6,718,659 B2 | 4/2004 | Foutz | |
| 6,834,447 B1 | 12/2004 | Currey | |
| 6,953,166 B2 | 10/2005 | Schenk | |
| 7,186,059 B2 | 3/2007 | Barnes | |
| 2004/0211092 A1 | 10/2004 | Barnes | |
| 2007/0000156 A1 | 1/2007 | Greenberg et al. | |

OTHER PUBLICATIONS

Superior Manufacturing SPD-350 Padding Maching product brochure, undated.
Office Action issued Jan. 5, 2009, for U.S. Appl. No. 11/551,130, 32 pages.
CRC-Evans Pipeline Equipment product information, "Selfloading Superscreen Pipeline Padding Machine," undated, 2pgs.
Outlaw Padding Company product information, "Rob'n Fines to Pad Your Lines," undated, 2 pgs.
Office Action issued for U.S. Appl. No. 11/170,264 dated Mar. 25, 2008 (15 pages).
Office Action dated Sep. 19, 2008, for U.S. Appl. No. 11/170,264.
Office Action issued Jul. 21, 2009, for U.S. Appl. No. 11/170,264, 16 pages.
Office Action issued Nov. 13, 2009, for U.S. Appl. No. 11/170,264, 16 pages.
Office Action issued Jul. 20, 2010, for U.S. Appl. No. 11/170,264, 13 pages.
International Search Report and Written Opinion issued for International Application No. PCT/US07/81071 dated May 6, 2008 (7 pages).

* cited by examiner

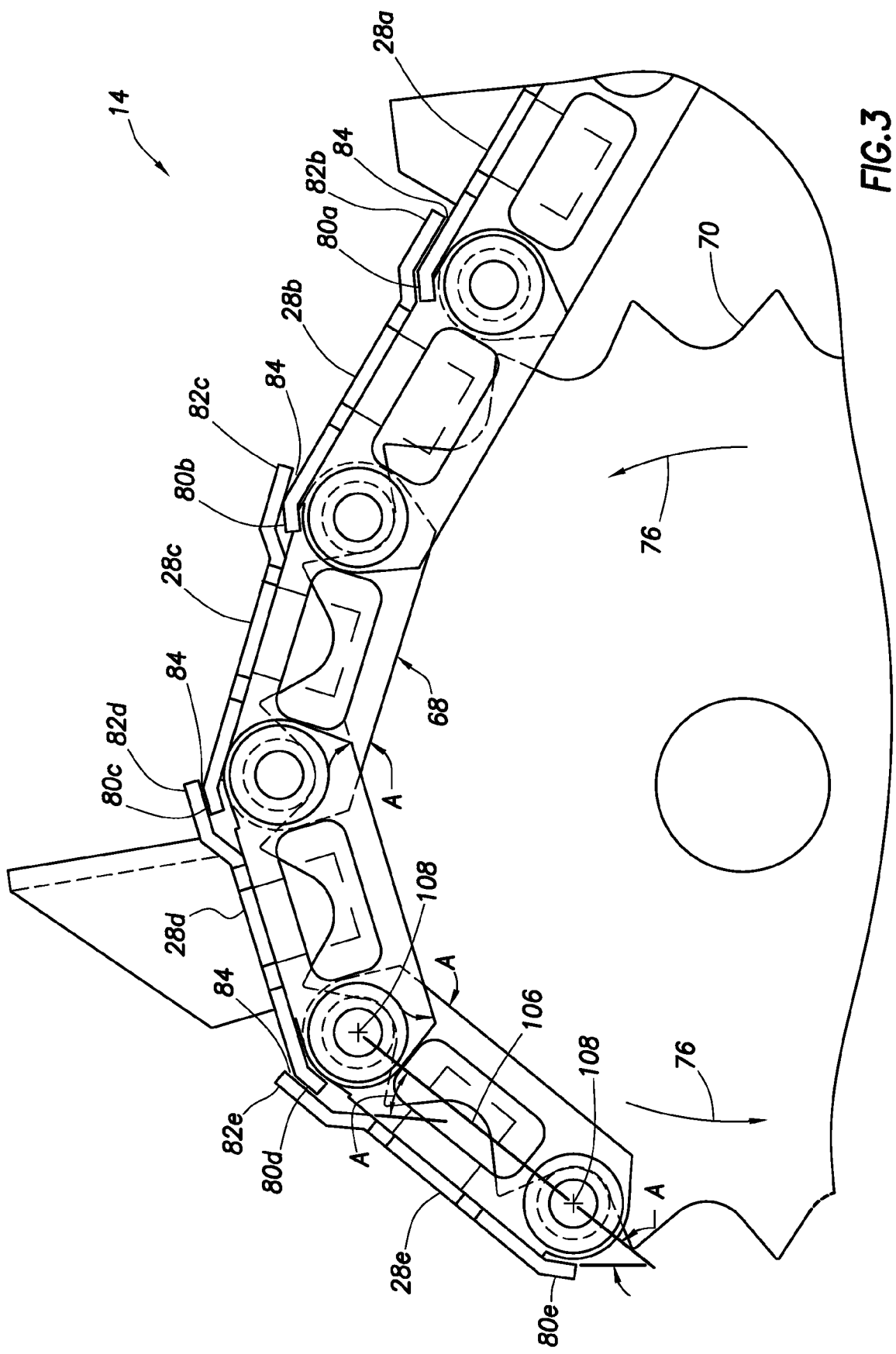

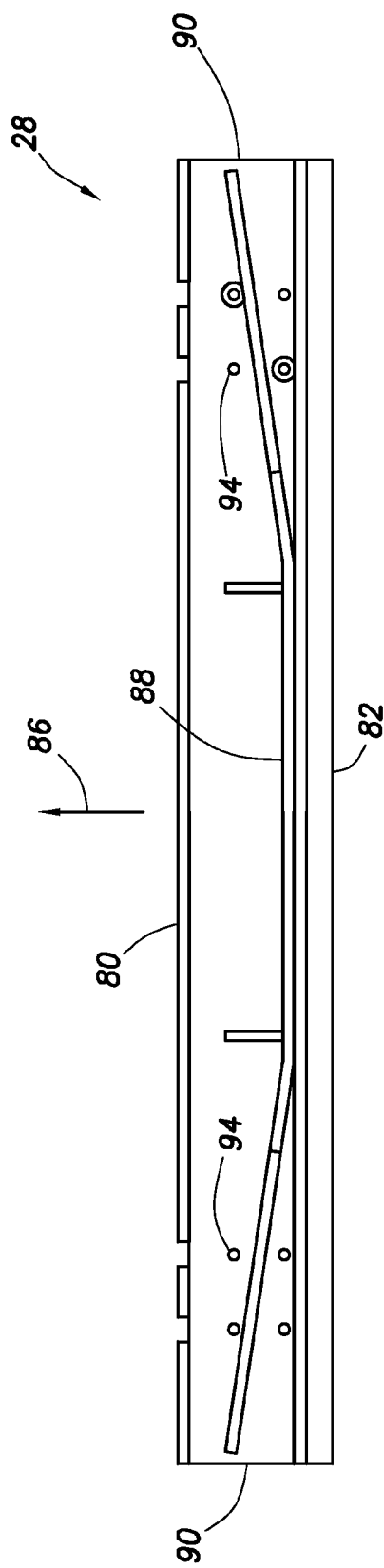
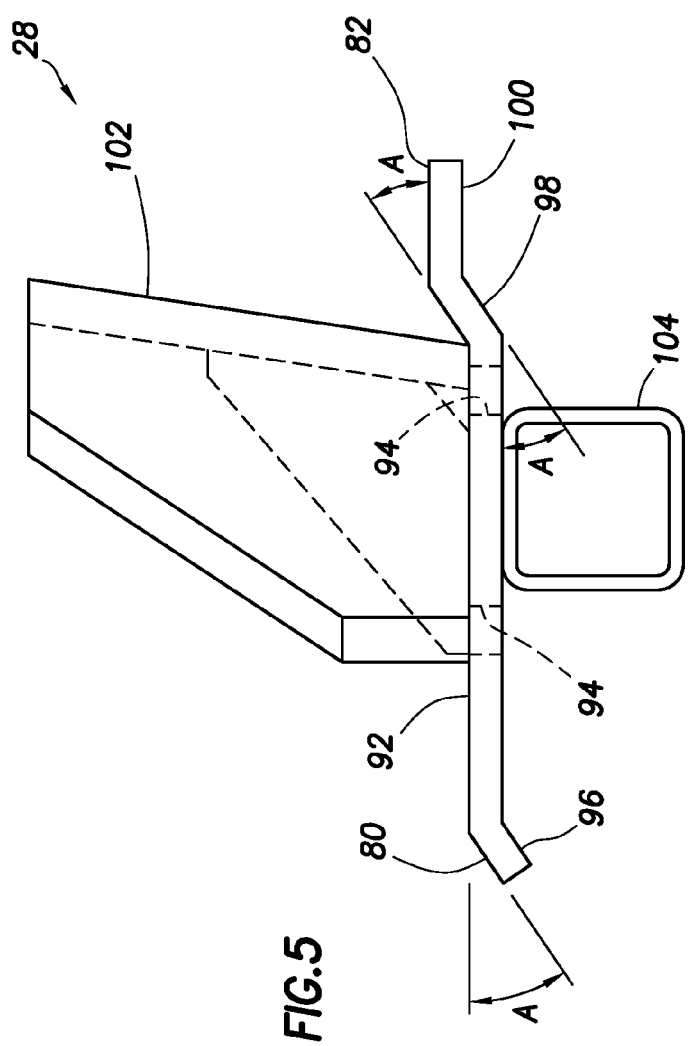

PIPELINE PADDING MACHINE WITH A DEBRIS-RESISTANT ESCALATOR ASSEMBLY

BACKGROUND

The present invention relates generally to equipment utilized in conjunction with pipeline operations and, in an embodiment described herein, more particularly provides a pipeline padding machine with a debris-resistant escalator assembly.

In constructing pipelines, a ditch is typically dug by excavating material from the ground, and then a pipe (including many interconnected pipe sections) is positioned in the ditch. The excavated material can include objects (such as large rocks, sharp objects, etc.) which could damage the pipe or otherwise hinder the pipeline operation (such as by creating large voids in the ditch, etc.).

Therefore, instead of merely covering the pipe by pushing the excavated material back into the ditch, only a portion of the excavated material is used around the pipe in the ditch. This portion of the excavated material is the relatively fine portion and is known to those skilled in the art as "padding" since it forms a protective layer surrounding the pipe. The remainder of the excavated material can be deposited in the ditch above the padding if desired.

Several machines have been developed to separate the padding from the remainder of the excavated material and place the padding in the ditch about the pipe. However, these prior padding machines typically have one or more shortcomings. For example, these padding machines may include escalator flights which permit an inordinate amount of the excavated material to pass through the flights and hinder operation of the track, drive mechanism, etc. below.

Therefore, it may be seen that improvements are needed in the art of pipeline padding machines. It is among the objects of the present invention to provide such improvements.

SUMMARY

In carrying out the principles of the present invention, a pipeline padding machine is provided which solves at least one problem in the art. One example is described below in which the padding machine includes an escalator assembly with an improved debris-resistant flight. The flight includes sections which prevent an excessive amount of excavated material from passing between the flight sections.

In one aspect of the invention, a pipeline padding machine is provided which includes an escalator assembly with multiple flight sections attached to a track. A gap between leading and trailing edges of respective adjacent flight sections is substantially the same when the track is substantially straight, and when the track is at its maximum curvature.

In another aspect of the invention, a pipeline padding machine includes an escalator assembly including multiple flight sections attached to a track having multiple corresponding track sections. Each track section is angled relative to an adjacent track section by a selected angle when the track is at its maximum curvature. Each flight section has an edge portion which is angled relative to a longitudinal axis of the corresponding track section by substantially the same selected angle. Each flight section also has an opposite edge portion which is angled relative to the longitudinal axis of the corresponding track section by substantially the same selected angle.

In yet another aspect of the invention, a pipeline padding machine includes an escalator assembly including multiple flight sections attached to a track having multiple corresponding track sections. Each flight section has opposite edge portions. The edge portions of respective adjacent flight sections are substantially parallel to each other when the track is at its maximum curvature.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

BRIEF DESCRIPTION OF THE DRAWINGS

FIG. 3 is a side view of an escalator assembly which embodies principles of the invention, for use in the pipeline padding machine of FIG. 1;

FIG. 4 is a top view of an escalator flight section which embodies principles of the invention, for use in the escalator assembly of FIG. 3; and FIG. 5 is an enlarged scale side view of the escalator flight section of FIG. 4.

DETAILED DESCRIPTION

It is to be understood that the various embodiments of the present invention described herein may be utilized in various orientations and configurations, without departing from the principles of the present invention. The embodiments are described merely as examples of useful applications of the principles of the invention, which is not limited to any specific details of these embodiments. In the following description of the representative embodiments of the invention, directional terms (such as "above", "below", "upper", "lower", etc.) are used for convenience in referring to the accompanying drawings.

Figure 1:
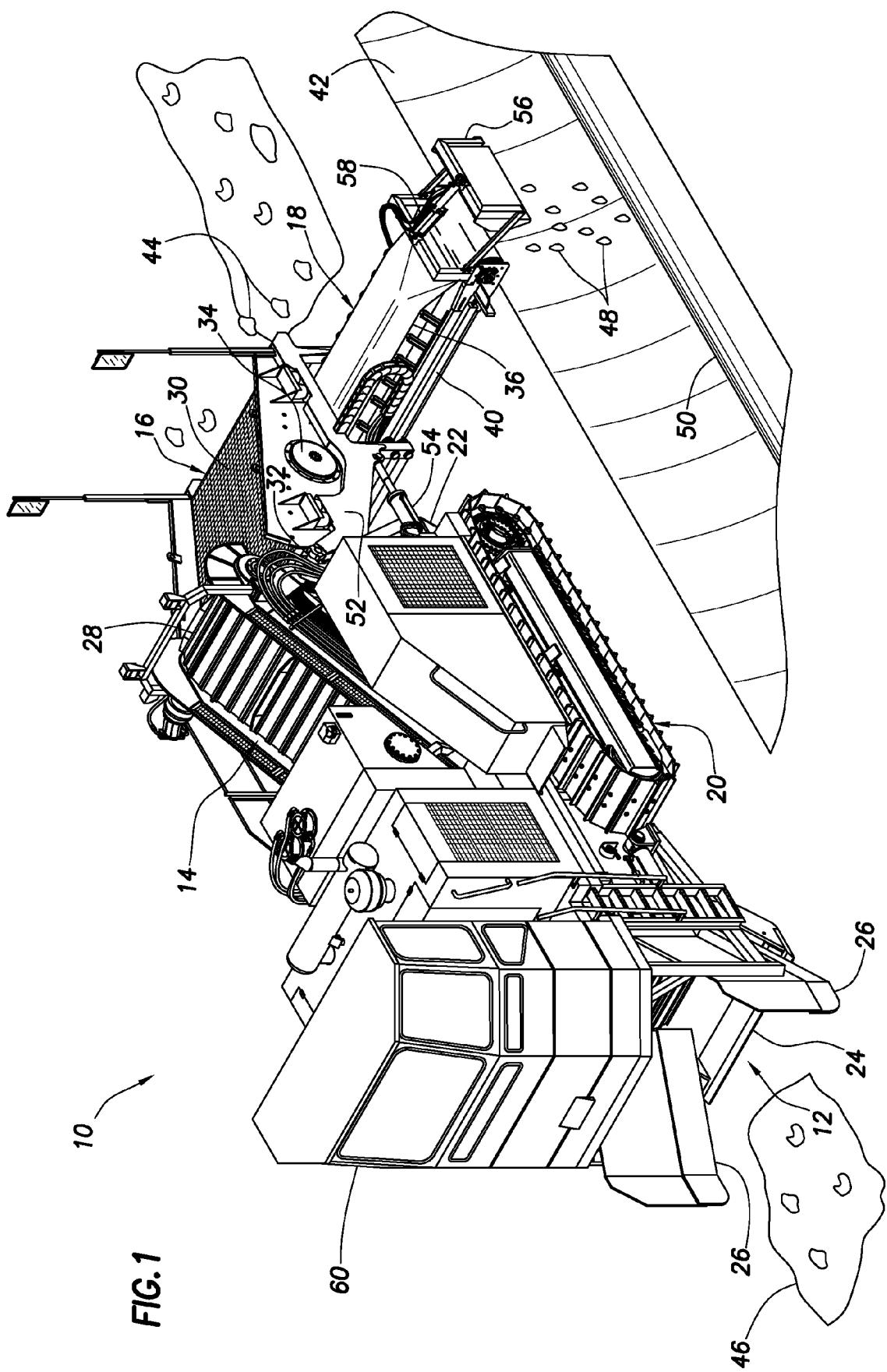
FIG. 1 is an isometric view of a pipeline padding machine embodying principles of the present invention.

Representatively illustrated in FIG. 1 is a pipeline padding machine 10 which embodies principles of the present invention. The machine 10 includes a material collection assembly 12 for gathering material 46 alongside a ditch 42 in which pipe 50 is laid.

The material 46 is typically the same material which was previously excavated to form the ditch 42. However, this is not necessary. For example, the material 46 could be transported from another location, and/or the machine 10 may be used to collect previously undisturbed material from a ground surface as described more fully below.

The machine 10 includes a material escalator assembly 14 for elevating the material 46 from the material collection assembly 12 and depositing the material onto a separator assembly 16. The separator assembly 16 separates the material 46 into a relatively fine padding 48 and a relatively coarse residue 44.

The padding 48 is deposited onto a conveyor assembly 18 which transports the padding laterally to the ditch 42. The padding 48 is deposited from the conveyor assembly 18 into the ditch 42.

A transport assembly 20 is used to transport the machine 10 along the side of the ditch 42. A main frame 22 is attached to the transport assembly 20 for supporting the collection, escalator, separator and conveyor assemblies 12, 14, 16, 18.

The collection assembly 12 includes a cutting edge 24 for cutting through the material 46 piled alongside and generally parallel to the ditch 42, and side walls 26 which are shaped to funnel the material toward a lower end of the escalator assembly 14. The side walls 26 are vertically adjustable relative to the cutting edge 24, and the cutting edge is pivotable relative to the escalator assembly 14.

The escalator assembly 14 includes a flight of individual sections 28 which are used to elevate the material 46 from the collection assembly 12 and deposit the material onto the separator assembly 16. The escalator assembly 14 is pivotable relative to the main frame 22 about a pivot 32 to thereby vertically adjust the lower end of the escalator assembly. Preferably, the lower end of the escalator assembly 14 is vertically adjustable from about one foot downward to about four feet upward relative to ground level to compensate for various terrain slopes and material collection requirements.

The fight sections 28 may be specially configured so that adjacent flight sections continually overlap each other, as described more fully below. This prevents excessive amounts of the material 46 from falling through the escalator flight and interfering with the operation of the track, drive mechanism, etc. of the escalator assembly 14, as well as other portions of the padding machine 10.

The separator assembly 16 includes a screen 30 which is inclined downward toward the rear of the machine 10. A shaker 34 vibrates the screen 30. The screen 30 has openings sized to permit the relatively fine padding material 48 to pass downward therethrough, while the relatively coarse residue 44 travels across the top of the screen and eventually falls off of the separator assembly 16 onto the ground alongside the ditch 42.

The conveyor assembly 18 includes a belt 36 and rollers (not visible in FIG. 1) mounted to rails 40. The belt 36 is positioned beneath the screen 30 so that the padding material 48 is deposited onto the belt after passing through the screen. The belt 36 transports the padding material 48 laterally, and the padding material then drops off of the belt into the ditch 42.

The rails 40 are used to permit the conveyor assembly 18 to be adjusted laterally, for example, to compensate for varying lateral distances between the machine 10 and the ditch 42. The rails 40 also permit the conveyor assembly 18 to be extended outwardly from either lateral side of the machine 10 so that the machine may be used on either lateral side of the ditch 42.

A deflector 56 is attached to the outer end of the conveyor assembly 18. The deflector 56 is used to more accurately position the padding 48 about the pipe 50 as it falls from the belt 36. A hydraulic cylinder 58 or other type of actuator may be used to pivot or otherwise position the deflector 56 relative to the outer end of the belt 36.

The separator and conveyor assemblies 16, 18 are mounted on a frame 52 which is pivotably mounted to the main frame 22 at the pivots 32. Hydraulic cylinders 54 are used to pivot the frame 52 relative to the main frame 22, but other types of actuators may be used if desired.

Thus, the separator and conveyor assemblies 16, 18 are pivotable relative to the main frame 22 to thereby allow the belt 36 to remain generally horizontal and allow the screen 30 to remain at a desired inclination even though the machine 10 may traverse terrain having varying slopes. That is, although the machine 10 may travel uphill or downhill at varying inclines, the belt 36 can be maintained generally horizontal and the screen 30 can be maintained at a desired inclination by pivoting the frame 52 as needed relative to the main frame 22.

It will be appreciated that many functions need to be controlled in operation of the machine 10. Among these are: speed and direction of transport of the machine 10 by the transport assembly 20, position of the cutting edge 24, speed and direction of travel of the flight sections 28, pivoting of the escalator assembly 14 relative to the main frame 22, pivoting of the frame 52 relative to the main frame 22, operation of the shaker 34, speed and direction of the belt 36, lateral position of the conveyor assembly 18, position of the deflector 56, etc. Various control devices (such as switches, control valves, etc. of the type known to those skilled in the art) are used to control these functions.

In the embodiment of the machine 10 as depicted in FIG. 1, the control devices are not visible. However, the control devices are located within an enclosed cab 60 attached above the collection assembly 12 and the lower end of the escalator assembly 14. Note that the cab 60 pivots with the escalator assembly 14 relative to the main frame 22, so the cab is vertically adjustable with the lower end of the escalator assembly.

Preferably, an interior of the cab 60 is climate controlled, with air conditioning and heating systems for operator comfort. The cab 60 is also preferably supplied with two laterally separated control station locations so that when the machine 10 is operated on one side of the ditch 42 the operator can clearly view the ditch and the placement of the padding 48 in the ditch from one of the control station locations, and when the machine is operated on the opposite side of the ditch the operator can clearly view the ditch and the placement of the padding in the ditch from the other control station location.

A padding machine similar to the machine 10 depicted in FIG. 1 is described in U.S. patent application Ser. No. 11/170,264, the entire disclosure of which is incorporated herein by this reference. However, it should be clearly understood that the padding machine 10 described above is only one example of a wide variety of padding machines which may incorporate principles of the invention. Other padding machines, and other types of padding machines, may be used without departing from the principles of the invention.

Figure 2:
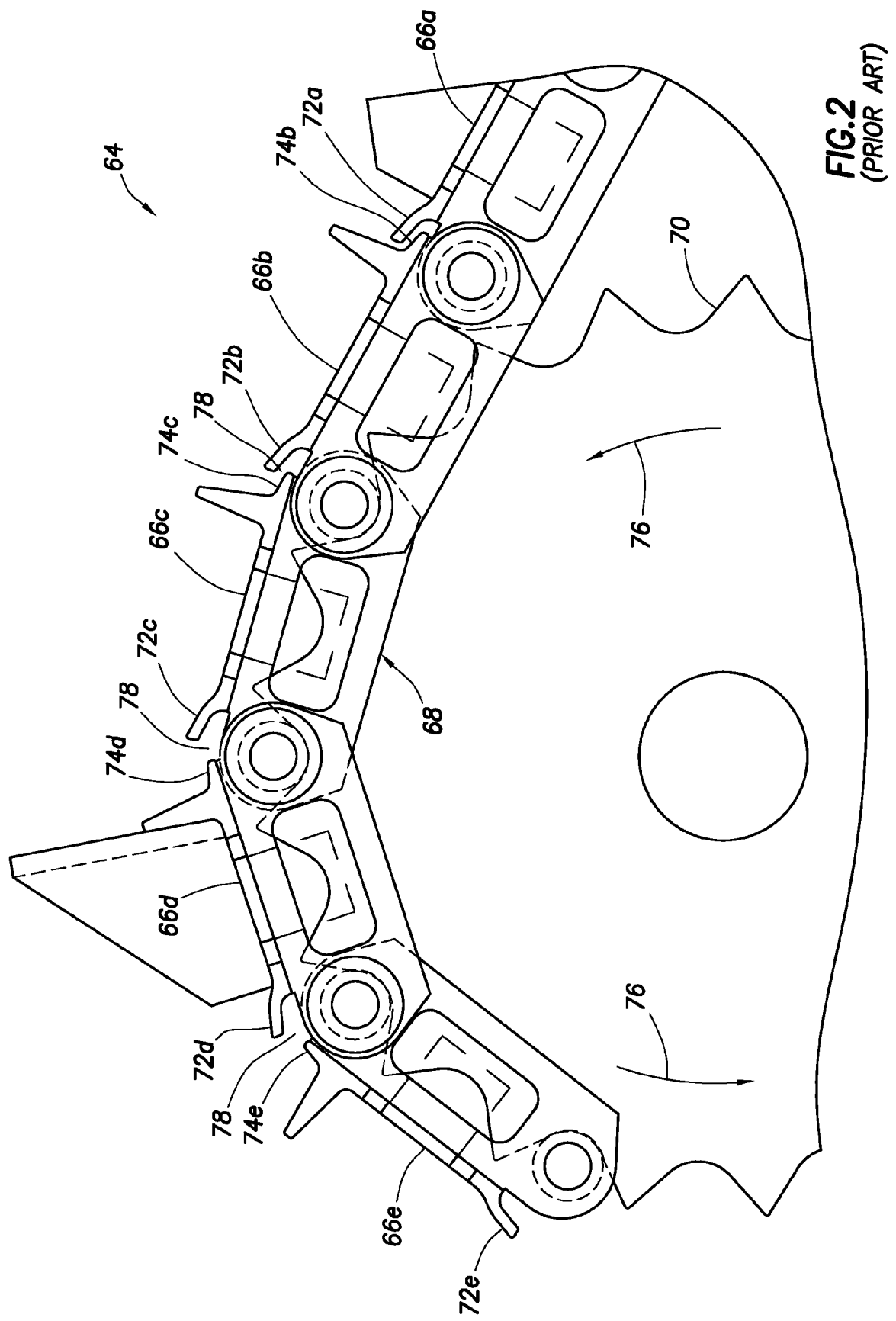
FIG. 2 is an enlarged scale side view of a prior art escalator assembly.

Referring additionally now to FIG. 2, a portion of a prior art escalator assembly 64 is representatively illustrated. The escalator assembly 64 includes multiple flight sections 66a-d mounted to links of a chain-type track 68. The track 68 passes over a sprocket 70, which may be used either to drive the track, or merely guide the track. The direction of rotation of the sprocket 70 is indicated by arrows 76.

Note that a leading edge 72a of the section 66a overlaps a trailing edge 74b of an adjacent section 66b only when the track 68 is substantially straight. When the track 68 begins to curve about the sprocket 70, a gap 78 between adjacent flight sections begins to widen.

This situation is particularly detrimental for several reasons. For example, the gap 78 is at its widest as the track 68 passes over the sprocket 70, which means that the material 46 is allowed to fall onto the sprocket and its associated drive mechanism, where the material can interfere with the operation of the sprocket and drive mechanism. As another example, the track 68 becomes substantially straight again after passing over the sprocket 70. Material 46 which falls through the gaps 78 can accumulate on the straight portion of the track 68 and interfere with operation of the track and any subsequent drive mechanism.

Note that the gaps 78 open upward as the flight sections 66a-e ascend in the escalator assembly 64. This upward opening of the gaps 78 allows a substantial amount of the material 46 to fall into the gaps. This is due in part to the fact that the leading edges 72a-e of the sections 66a-e outwardly overlap the trailing edges 74b-e of the adjacent sections.

Furthermore, note that the trailing edges 74b-e extend straight rearward. Only the leading edges 72a-e are curved to form overlaps with the trailing edges 74b-e.

Referring additionally now to FIG. 3, a portion of the improved escalator assembly 14 is representatively illustrated apart from the remainder of the padding machine 10. Elements of the escalator assembly 14 which are similar to those previously described are indicated in FIG. 3 using the same reference numbers. The escalator assembly 14 may be used in other padding machines, and other types of padding machines, in keeping with the principles of the invention.

Several flight sections 28a-e are depicted in FIG. 3, each of which is attached to the track 68 which passes over the sprocket 70. The flight sections 28a-e include leading edges 80a-e which are continually in an overlapping relationship with trailing edges 82b-e of adjacent flight sections. In this manner, the ability of the material 46 to fall between the leading and trailing edges 80a-e, 82b-e is substantially reduced.

Note that a gap 84 between the leading and trailing edges 80a-e, 82b-e does not increase as the track 68 passes over the sprocket 70. Instead, the gap 84 initially decreases (as between leading edge 80b and trailing edge 82c as depicted in FIG. 3) as the track 68 begins to curve about the sprocket 70, and then the gap resumes its original dimension (compare the gap between the edges 80c, 82d with the gap between the edges 80a, 82b) as the track is at its maximum curvature about the sprocket.

Furthermore, note that the gaps 84 do not open upward as the sections 28a-e ascend on the track 68. Instead, the gaps 84 open downward, thereby preventing the material 46 from falling into the gaps as the sections 28a-e ascend.

The corresponding leading and trailing edges 80a-e, 82b-e always overlap each other, no matter where the track 68 is positioned relative to the sprocket 70. This continual overlapping relationship minimizes the amount of material 46 which can fall through the gaps 84.

As described more fully below, the flight sections 28a-e can be specially configured to suit any of a variety of differently configured tracks and sprockets. In the configuration depicted in FIG. 3, an angle A is formed between adjacent sections of the track 68 when it is at its maximum curvature about the sprocket 70. This angle A may vary depending on several factors, such as the diameter of the sprocket 70, the number of teeth on the sprocket or the pitch of the track 68, etc.

Referring additionally now to FIG. 4, one of the escalator flight sections 28 is representatively illustrated apart from the remainder of the machine 10. The flight section 28 is shown from a top plan view, with the direction of travel during normal operation of the escalator assembly 14 being indicated by an arrow 86.

In this view it may be seen that the flight section 28 includes a recess 88 which is concave in the direction of travel 86 of the flight section. This concave recess 88 permits wet material 46 to be conveyed more efficiently up the escalator assembly 14, and also aids in urging the material toward the middle of the flight section 28 and away from its lateral sides 90. This helps to prevent the material 46 from collecting at the sides of the escalator assembly 14.

Referring additionally now to FIG. 5, an enlarged scale side elevational view of the flight section 28 is representatively illustrated. In this view it may be seen that the flight section 28 includes a substantially flat body portion 92 extending between the leading edge 80 and the trailing edge 82. In use, the body portion 92 is attached to a section of the track 68, for example, using fasteners extending through openings 94 in the body portion.

Note that the leading edge 80 includes a downwardly angled portion 96. Preferably, the portion 96 is angled relative to the body portion 92 (and the section of the track 68 to which it is attached) by the same angle A as described above between adjacent sections of the track when the track is at its maximum curvature.

The trailing edge 82 similarly includes a portion 98 which is angled relative to the body portion 92 by the angle A, and another portion 100 which is parallel to the body portion (i.e., angled relative to the portion 98 by the angle A). As a result, the portion 96 of the leading edge 80 and the portion 98 of the trailing edge 82 are each angled relative to a longitudinal axis 106 of the corresponding track section between its pivots 108 by the same angle A (see FIG. 3). Consequently, the portion 96 of the leading edge 80 and the portion 100 of the trailing edge 82 are parallel to each other when the track 68 is at its maximum curvature about the sprocket 70.

Note that it is not necessary for the angles A shown in FIGS. 3 & 5 to be exactly identical, but preferably they are substantially equal. In addition, the leading and trailing edges 80, 82 could be reversed, if desired. The portion 96 of the leading edge 80 could be angled upward, and the portion 98 of the trailing edge 82 could be angled downward. Thus, it will be appreciated that many changes may be made to the configuration of the flight section 28 depicted in FIG. 5, without departing from the principles of the invention.

An upstanding wall 102 may be secured to an upper side of the body portion 92 of the flight section 28 (such as by welding). The height of this wall 102 may be varied as desired, and it is not necessary for every one of the flight sections 28 in the escalator assembly 14 to have the same height walls, since different height walls may be used on different flight sections. Some flight sections 28 may not include the wall 102 at all.

A reinforcement 104 may be secured to a lower side of the body portion 92 of the flight section 28 (such as by welding). Alternatively, the wall 102 and associated gussets, brackets, etc. may provide sufficient reinforcement for the flight section 28. The reinforcement 104 may be used with all of the flight sections 28, or only with those which do not include the wall 102.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A pipeline padding machine, comprising:
an escalator assembly including multiple flight sections attached to a track, wherein each flight section includes a flat leading edge and a trailing end with respect to a direction of travel, the trailing end including a flat trailing edge and a flat angled portion, and wherein the trailing end of each flight section is positioned overlying the leading edge of a next adjacent flight section as the flight sections ascend in the escalator assembly.

2. The pipeline padding machine of claim 1, wherein a gap between adjacent flight sections is substantially the same when the track is substantially straight, and when the track is at its maximum curvature.

3. The pipeline padding machine of claim 2, wherein on an exterior side of the flight sections, the gap opens downwardly as the flight sections ascend in the escalator assembly.

4. The pipeline padding machine of claim 1, wherein the track includes multiple sections, each track section being angled relative to an adjacent track section by a selected angle when the track is at its maximum curvature, wherein the leading edge of each flight section is angled relative to a longitudinal axis of a corresponding one of the track sections by substantially the same selected angle, and wherein the angled portion of each flight section is angled relative to the longitudinal axis of the corresponding track section by substantially the same selected angle.

5. The pipeline padding machine of claim 1, wherein at least one flight section includes an upstanding wall portion.

6. The pipeline padding machine of claim 4, wherein the trailing edge and a body portion of each flight section are parallel to the longitudinal axis of the corresponding track section.

7. The pipeline padding machine of claim 6, wherein the angled portion is positioned between the body portion and the trailing edge of each flight section.

8. The pipeline padding machine of claim 1, wherein the leading edge and the angled portion of respective adjacent flight sections are substantially parallel to each other when the track is substantially straight.

9. The pipeline padding machine of claim 1, wherein the leading edge and the trailing edge of respective adjacent flight sections are substantially parallel to each other when the track is at its maximum curvature.

10. The pipeline padding machine of claim 6, wherein an upstanding wall portion is secured to the body portion.

11. The pipeline padding machine of claim 6, wherein the body portion of each flight section is positioned between the leading edge and the angled portion.

12. A pipeline padding machine, comprising:
an escalator assembly including multiple flight sections attached to a track having multiple corresponding track sections, each track section being angled relative to an adjacent track section by a selected angle when the track is at its maximum curvature, each flight section including a leading edge, with respect to a direction of travel, which is angled relative to a longitudinal axis of the corresponding track section by substantially the same selected angle, and each flight section including a trailing end, with respect to the direction of travel, the trailing end including a trailing edge and an angled portion, wherein the angled portion is angled relative to the longitudinal axis of the corresponding track section by substantially the same selected angle and the trailing edge is substantially parallel to the longitudinal axis of the corresponding track section.

13. The pipeline padding machine of claim 12, wherein at least one flight section includes an upstanding wall portion.

14. The pipeline padding machine of claim 12, wherein the angled portion is positioned between the leading and trailing edges on each flight section.

15. The pipeline padding machine of claim 12, wherein the leading edge and the angled portion of respective adjacent flight sections are substantially parallel to each other when the track is substantially straight.

16. The pipeline padding machine of claim 12, wherein the leading edge and the trailing edge of respective adjacent flight sections are substantially parallel to each other when the track is at its maximum curvature.

17. The pipeline padding machine of claim 12, wherein a body portion of each flight section is positioned between the leading edge and the angled portion.

18. The pipeline padding machine of claim 12, wherein a gap between adjacent flight sections is substantially the same when the track is substantially straight, and when the track is at its maximum curvature.

19. The pipeline padding machine of claim 17, wherein an upstanding wall portion is secured to the body portion.

20. The pipeline padding machine of claim 18, wherein on an exterior side of the flight sections, the gap opens downwardly as the flight sections ascend in the escalator assembly.

\* \* \* \* \*

UNITED STATES PATENT AND TRADEMARK OFFICE
CERTIFICATE OF CORRECTION

PATENT NO. : 7,927,059 B2
APPLICATION NO. : 11/548316
DATED : April 19, 2011
INVENTOR(S) : Giordano Grassi et al.

It is certified that error appears in the above-identified patent and that said Letters Patent is hereby corrected as shown below:

Column 6, line 14, replace the text "100" with --98--.

Signed and Sealed this
Sixth Day of March, 2012

David J. Kappos
*Director of the United States Patent and Trademark Office*